(12) United States Patent
Atitallah et al.

(10) Patent No.: US 12,094,504 B1
(45) Date of Patent: Sep. 17, 2024

(54) MAGNETIC RECORDING HEAD WITH A PIEZOELECTRIC ACTUATOR FOR CONTROLLING HEAD-MEDIA SPACING

(71) Applicant: Seagate Technology LLC, Fremont, CA (US)

(72) Inventors: Hassene Ben Atitallah, Eden Prairie, MN (US); Yixuan Li, Edina, MN (US); Neil Zuckerman, Eden Prairie, MN (US); Raul H Andruet, Woodbury, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/330,503

(22) Filed: Jun. 7, 2023

Related U.S. Application Data

(60) Provisional application No. 63/366,263, filed on Jun. 13, 2022.

(51) Int. Cl.
*G11B 5/55* (2006.01)
*G11B 5/48* (2006.01)

(52) U.S. Cl.
CPC ............ *G11B 5/5552* (2013.01); *G11B 5/483* (2015.09); *G11B 5/4873* (2013.01)

(58) Field of Classification Search
None
See application file for complete search history.

(56) References Cited

U.S. PATENT DOCUMENTS

| | | | |
|---|---|---|---|
| 5,473,486 A * | 12/1995 | Nepela | G11B 5/6005 |
| 5,943,189 A * | 8/1999 | Boutaghou | G11B 5/5552 |
| 6,487,045 B1 * | 11/2002 | Yanagisawa | G11B 5/5552 |
| 6,570,730 B1 * | 5/2003 | Lewis | G11B 5/483 |
| | | | 29/603.04 |
| 7,369,347 B2 | 5/2008 | Lee | |
| 7,388,726 B1 * | 6/2008 | McKenzie | G11B 5/607 |
| | | | 360/78.07 |
| 7,773,346 B1 * | 8/2010 | Guo | G11B 5/6005 |
| | | | 360/294.4 |
| 7,835,115 B2 * | 11/2010 | Meyer | G11B 5/4826 |
| | | | 360/294.7 |
| 8,593,749 B2 | 11/2013 | Atsumi et al. | |

(Continued)

FOREIGN PATENT DOCUMENTS

| | | | | |
|---|---|---|---|---|
| JP | 2000348321 A | * | 12/2000 | G11B 5/5552 |
| JP | 2009259376 A | * | 11/2009 | G11B 5/4826 |

OTHER PUBLICATIONS

Juang, et al., "Controlled-flying proximity sliders for head-media spacing variation suppression in ultralow flying air bearings," in IEEE Transactions on Magnetics, vol. 41, No. 10, Oct. 2005, pp. 3052-3054, doi: 10.1109/TMAG.2005.855255.

(Continued)

*Primary Examiner* — William J Klimowicz
(74) *Attorney, Agent, or Firm* — Mueting Raasch Group

(57) ABSTRACT

A magnetic recording head includes an active component and a piezoelectric actuator. The active component is disposed proximal to a media-facing surface of the magnetic recording head. The piezoelectric actuator includes a piezoelectric layer, a first electrode coupled to the piezoelectric layer, and a second electrode coupled to the piezoelectric layer. The piezoelectric actuator is configured to exert a mechanical force to displace the active component such that the displacement changes a protrusion of the active component from the media-facing surface.

10 Claims, 11 Drawing Sheets

(56) References Cited

U.S. PATENT DOCUMENTS

| | | | |
|---|---|---|---|
| 8,804,275 | B1 | 8/2014 | Mate |
| 8,837,075 | B2 | 9/2014 | Hanchi et al. |
| 8,867,323 | B2 | 10/2014 | Andruet et al. |
| 9,202,497 | B2 | 12/2015 | Rea et al. |
| 10,311,905 | B1 | 6/2019 | Guo et al. |
| 2002/0071215 | A1* | 6/2002 | Lewis ............... G11B 5/60 |
| 2002/0191342 | A1* | 12/2002 | Yanagisawa ...... G11B 5/5552 29/25.35 |
| 2003/0095361 | A1* | 5/2003 | Shimanouchi ........... G11B 5/54 |
| 2005/0088784 | A1* | 4/2005 | Macken ............. G11B 5/3106 |
| 2008/0158713 | A1* | 7/2008 | Bhatia ............... G11B 5/6058 |
| 2009/0080119 | A1* | 3/2009 | Kurihara ............ G11B 5/6058 360/313 |
| 2009/0219653 | A1* | 9/2009 | Aoki ..................... G11B 5/56 427/532 |
| 2009/0237841 | A1* | 9/2009 | Kurihara ............ G11B 5/4873 |
| 2009/0296264 | A1* | 12/2009 | Meyer ................ G11B 5/4826 360/75 |
| 2010/0073823 | A1* | 3/2010 | Aoki .................. H10N 30/208 360/291.9 |
| 2013/0170072 | A1* | 7/2013 | Meyer .................. G11B 5/48 360/75 |

OTHER PUBLICATIONS

Schatz, et al., "Pulsed laser deposition of piezoelectric lead zirconate titanate thin films maintaining a post-CMOS compatible thermal budget," Journal of Applied Physics Sep. 21, 2017; 122 (11): 114502. https://doi.org/10.1063/1.5000367, 9 pp.

Wang, et al., "A one-step residue-free wet etching process of ceramic PZT forpiezoelectric transducers," Sensors and Actuators A 290, Mar. 2019, pp. 130-136.

Kosec, et al., "Chemical solution deposition of PZT thin films for microelectronics," Materials Science in Semiconductor Processing, vol. 5, Issues 2-3, Apr.-Jun. 2002, pp. 97-103.

Ambika, et al., "Deposition of PZT thin films with {001}, {110}, and {111} crystallographic orientations and their transverse piezoelectric characteristics," Adv. Mat. Lett. Apr. 2012, 3(2), pp. 102-106.

Schroth, et al., "Application of sol-gel deposited thin PZT film for actuation of 1D and 2D scanners," Proceedings MEMS 98. IEEE. Eleventh Annual International Workshop on Micro Electro Mechanical Systems. An Investigation of Micro Structures, Sensors, Actuators, Machines and Systems (Cat. No. 98CH36176, Heidelberg, Germany, Jan. 25-29, 1998, pp. 402-407, doi: 10.1109/MEMSYS.1998.659790.

Zheng, et al., "Study on wet-etching of PZT thin film," Digest of Papers Microprocesses and Nanotechnology 2003. 2003 International Microprocesses and Nanotechnology Conference, Tokyo, Japan, Oct. 29-31, 2003, pp. 248-249, doi: 10.1109/IMNC.2003.1268739.

Bower, et al., "Transfer printing: An approach for massively parallel assembly of microscale devices," 2008 58th Electronic Components and Technology Conference, Lake Buena Vista, FL, USA, May 27-30, 2008, pp. 1105-1109, doi: 10.1109/ECTC.2008.4550113.

* cited by examiner

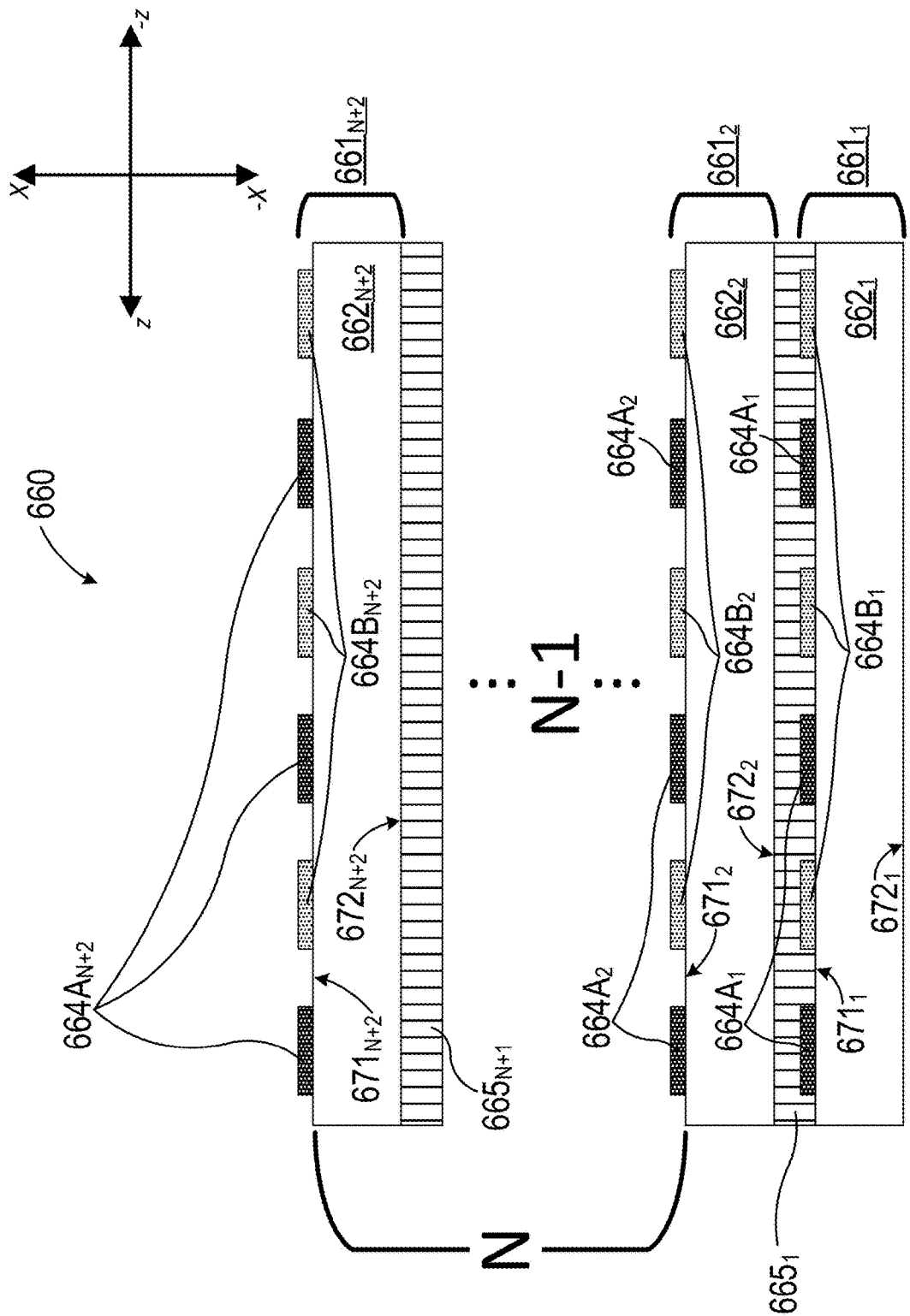

MAGNETIC RECORDING HEAD WITH A PIEZOELECTRIC ACTUATOR FOR CONTROLLING HEAD-MEDIA SPACING

This application claims priority to U.S. Provisional Patent Application Ser. No. 63/366,263, entitled "MAGNETIC RECORDING HEAD WITH A PIEZOELECTRIC ACTUATOR FOR CONTROLLING HEAD-MEDIA SPACING" and filed Jun. 13, 2022, the entire contents of which are hereby incorporated by reference.

TECHNICAL FIELD

The disclosure relates to a magnetic recording head for data storage.

BACKGROUND

A magnetic recording head of a hard disk drive (HDD) includes at least one active component. In some examples, an active component is a writer that is configured to produce a magnetic field and direct the magnetic field toward a surface of a magnetic disk to orient the magnetization of grains of the magnetic disk and produce bits of written data. In some examples, an active component is a reader that is configured to respond to magnetic fields from written bits of data on a surface of a magnetic disk and send signals representing the written data to electronics of the HDD to be decoded. In the example of a heat-assisted magnetic recording (HAMR) head, an active component may be a near-field transducer that is configured to direct optical energy toward a surface of a magnetic disk to lower the magnetic coercivity of grains of the magnetic disk and enable a writer to orient the magnetization of the grains to produce bits of written data.

The ability of a magnetic recording head to write and read data to and from a magnetic disk, respectively, is in part determined by the distance between the magnetic recording head and the magnetic disk. This dimension is referred to as the head-media spacing (HMS). More specifically, an HMS may be defined as a distance between an active component of a magnetic recording head and a magnetic disk (e.g., writer HMS, reader HMS). In the case of writer HMS, a closer (e.g., lower) HMS may enable bits of data to be written smaller and with sharper, more defined transitions, potentially increasing the amount data that can be written on the magnetic disk (known as the areal density capability, or ADC). In the case of reader HMS, a closer HMS may enable the reader to receive a stronger magnetic field, and thus a stronger signal, from the written bits of data. A stronger read signal may contribute to a higher signal-to-noise ratio (SNR) of the magnetic recording head, a metric that quantifies the ability of the magnetic head to resolve data with fewer errors. A higher SNR may also enable smaller bits to be written, potentially enabling higher ADC. However, while a close HMS may enable improved write and/or read capability of a magnetic recording, there is also a risk of mechanical damage to the magnetic recording head in the event of physical contact with the magnetic disk. Thus, the ability to minimize and consistently control the HMS of a component is a desired feature of a magnetic recording head.

SUMMARY

The present disclosure describes a magnetic recording head having a piezoelectric microactuator. The piezoelectric actuator is configured to displace one or more active components of the magnetic recording head in a manner that changes the head-media spacing (HMS) between an active component and a proximal magnetic disk. The piezoelectric actuator may, for example, expand or contract in response to receiving a signal (e.g., a voltage applied across a layer of the piezoelectric actuator). The expansion or contraction of the piezoelectric actuator may produce a force that is applied to an active component of the magnetic recording head, causing the active component to move toward or away from a surface of a proximal magnetic disk.

In some examples, utilizing a piezoelectric actuator to control an HMS between an active component of a magnetic recording head and a magnetic disk may provide more consistent control of and less variation in the HMS when compared to other means of controlling HMS (e.g., using a heater). Reducing variation in HMS may enable a lower target HMS to be utilized for an HDD cycle (e.g., a write cycle, a read cycle) by reducing the risk of contact between the magnetic recording head and the magnetic disk, and resultant damage to the magnetic recording head. As such, utilizing a piezoelectric actuator to control HMS may enable improvements related to capacity, speed, and/or reliability of an HDD (e.g., from writing smaller, more defined bits, enabling higher areal density capability (ADC); from providing higher signal-to-noise ratio and/or lower bit-error rate while reading bits). Additionally, a piezoelectric actuator may operate at a lower temperature than other means of HMS control (e.g., a heater) and may reduce thermal stress on the magnetic recording head, potentially improving reliability and/or extending the lifetime of the magnetic recording head. Finally, a piezoelectric actuator may consume less power than other means of HMS control, potentially reducing the power consumption of an HDD.

In one example, a magnetic recording head includes an active component disposed proximal to a media-facing surface of the magnetic recording head; and a piezoelectric actuator including a piezoelectric layer, a first electrode coupled to the piezoelectric layer and, a second electrode coupled to the piezoelectric layer, the piezoelectric actuator configured to exert a mechanical force to displace the active component such that the displacement changes a protrusion of the active component from the media-facing surface.

In another example, a magnetic recording head includes an active component disposed proximal to a media-facing surface of the magnetic recording head, a piezoelectric actuator configured to exert a mechanical force to displace the active component such that the displacement changes a protrusion of the active component from the media-facing surface, and a compliant layer that is coupled to a surface of the piezoelectric actuator and extends substantially orthogonal to and toward the media-facing surface.

In another example, a magnetic recording head includes an active component disposed proximal to a media-facing surface of the magnetic recording head, and a piezoelectric actuator including a plurality of piezoelectric elements provided in a stacked configuration along a stacking direction, wherein each piezoelectric element of the plurality of piezoelectric elements is adjacent to at least one other piezoelectric element of the plurality of piezoelectric elements.

These and other features and aspects of various examples may be understood in view of the following detailed discussion and accompanying drawings.

BRIEF DESCRIPTION OF THE DRAWINGS

FIG. 6A is a cross-sectional view of an example piezoelectric actuator of a magnetic recording head, in accordance with aspects of this disclosure.

DETAILED DESCRIPTION

Figure 1:
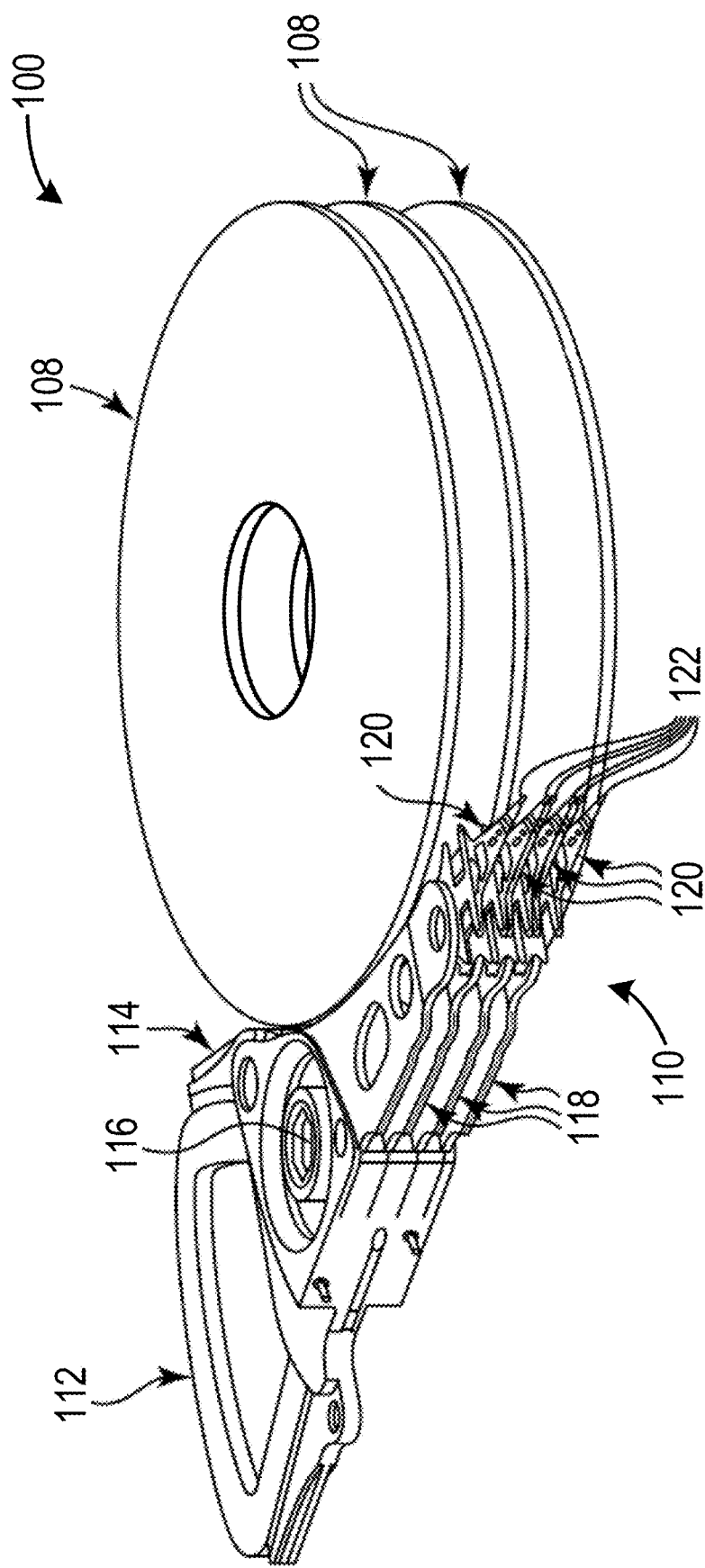
FIG. 1 is a perspective view of an example hard disk drive, in accordance with aspects of this disclosure.

FIG. 1 is a perspective view of an example heat-assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

Figure 2:
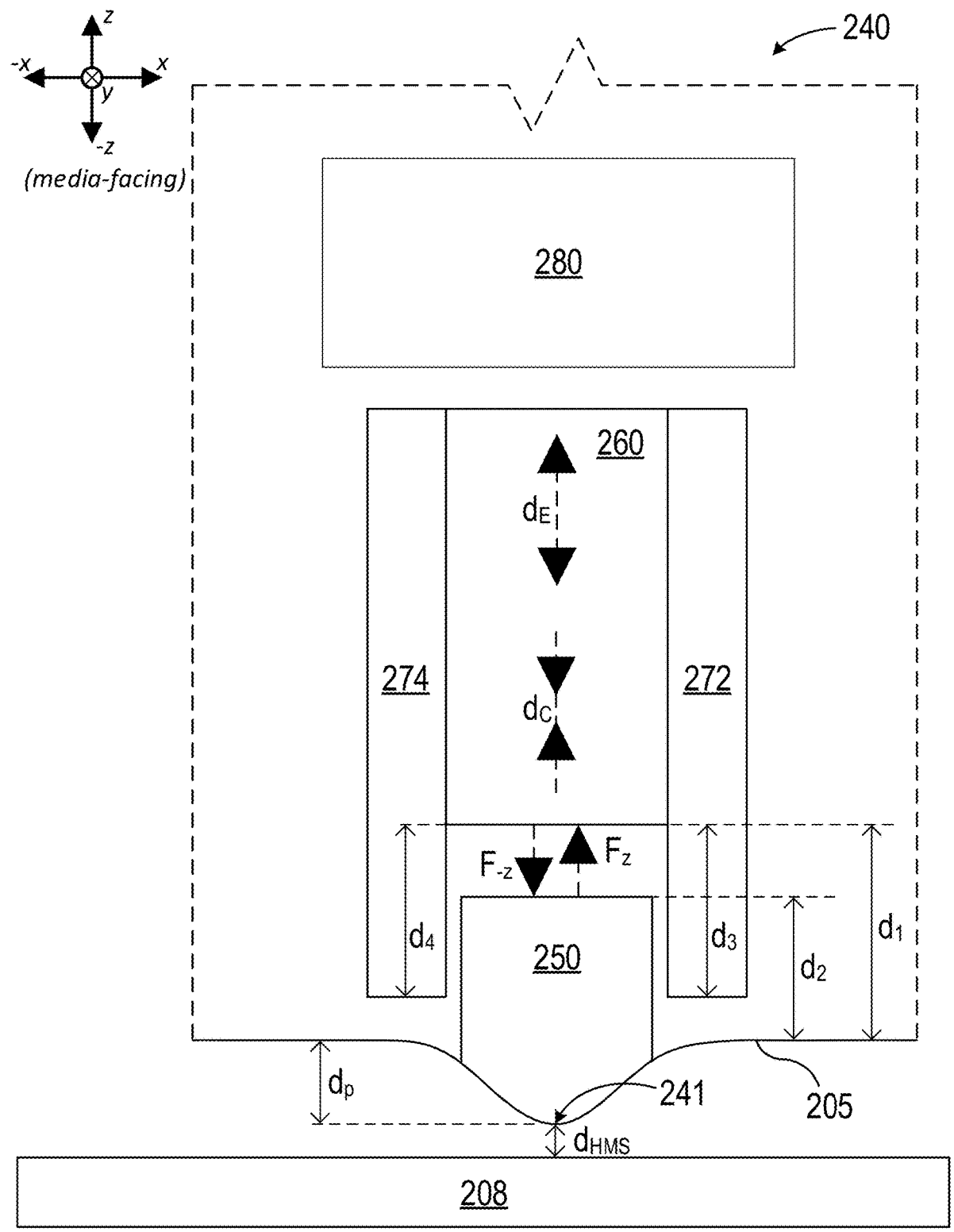
FIG. 2 is a cross-sectional view of an example magnetic recording head, in accordance with aspects of this disclosure.

FIG. 2 is a cross-sectional view of an example magnetic recording head, in accordance with aspects of this disclosure. Magnetic recording head 240 may be a magnetic recording head of HDD 100 of FIG. 1. Magnetic recording head 240 includes an active component 250 and a piezoelectric actuator 260. In the example of FIG. 2, magnetic recording head 240 includes compliant layers 272 and 274, and a blocking beam 280.

In some examples, active component 250 is a writer that is configured to generate a magnetic field from an electrical current and direct the magnetic field toward magnetic disk 208 to write bits of data on magnetic disk 208. In some examples, active component 250 is a reader that is configured to respond to magnetic fields from written bits of data on magnetic disk 208 and direct signals representing the bits of data to electronics of the HDD for decoding (e.g., a preamp, a channel). In some examples, active component 250 may be a feature associated with heat-assisted magnetic recording (HAMR), such as a near-field transducer (NFT) that is configured to direct energy toward magnetic disk 208 and reduce the magnetic coercivity of a portion of magnetic disk 208, thus enabling an associated writer of magnetic recording head 240 to write bits of data on magnetic disk 208.

Active component 250 is disposed proximal to a media-facing surface 205 of magnetic recording head. A feature or features of active component 250 may be presented on media-facing surface 205. Magnetic recording head 240 may be positioned over a surface of a proximal magnetic disk 208 such that a portion of active component 250 (e.g., a write pole of a writer, a tunneling magnetoresistive junction of a reader) is proximal to magnetic disk 208 and is separated from magnetic disk 208 by a head-media spacing (HMS) $d_{HMS}$.

In accordance with aspects of this disclosure, piezoelectric actuator 260 is configured to exert a mechanical force to displace active component 250 such that the displacement changes a protrusion $d_p$ of active component 250 from media-facing surface 205. Changing protrusion $d_p$ may change head-media spacing $d_{HMS}$ between active component 250 and magnetic disk 208. For example, during an HDD cycle (e.g., a write cycle, a read cycle), piezoelectric actuator 260 may exert a force F-z on active component 250 such that at least a portion of active component 250 (e.g., a write pole of a writer, a tunneling magnetoresistive (TMR) junction of a reader) moves in a −z direction toward magnetic disk 208, thus increasing protrusion $d_p$ and decreasing $d_{HMS}$. At the end of an HDD cycle, or, in some examples, during an HDD cycle or in a transition to another, different HDD cycle, piezoelectric actuator 260 may exert a force $F_z$ on active component 250, or relax a prior applied force on active component 250, such that at least a portion of active component 250 moves in a z direction away from magnetic disk 208, thus decreasing protrusion $d_p$ and increasing $d_{HMS}$.

A lower $d_{HMS}$ (i.e., closer spacing between active component 250 and magnetic disk 208) may benefit the performance of magnetic recording head 240 and its associated HDD (e.g., HDD 100 of FIG. 1). For example, a lower $d_{HMS}$ may enable smaller and/or more well-defined bits to be written, potentially enabling higher areal density capability (ADC). In some examples, a lower $d_{HMS}$ may enable improved readability of written bits on magnetic disk 208 (e.g., through higher signal-to-noise ratio (SNR), through lower bit-error rate (BER)). However, a lower $d_{HMS}$ may also increase the risk of undesired contact between magnetic recording head 240 and magnetic disk 208 and may result in mechanical damage to magnetic recording head 240. Utilizing piezoelectric actuator 260 to control HMS (e.g., $d_{HMS}$) may provide less variation, and thus higher accuracy, in targeting $d_{HMS}$ when compared with other means of displacing an active component of a magnetic recording head (e.g., a heater). Such improved control over $d_{HMS}$ variation and accuracy may enable a lower $d_{HMS}$ to be targeted while reducing risk of mechanical damage to magnetic recording head 240 and its respective components and features.

In some examples, reduced variation in $d_{HMS}$ when utilizing piezoelectric actuator 260 may result from a lower operating temperature of piezoelectric actuator 260. That is, excess heat from some means of controlling $d_{HMS}$ (e.g., a heater) may produce undesired expansion of material in the vicinity of an active component, causing variation in protrusion $d_p$ and thus in $d_{HMS}$. In contrast, utilizing piezoelectric actuator 260, which produces minimal additional heat, may result in a lower overall operating temperature of magnetic recording head 240 and less undesired thermallyinduced expansion and variation in protrusion $d_p$, providing a more consistent $d_{HMS}$. In some examples, piezoelectric actuator 260 may consume less power to produce a displacement of active component 250 when compared with other means of displacing an active component. The lower power consumption required to displace active component 250 by protrusion $d_p$ may reduce the overall power consumed by an HDD (e.g., HDD 100 of FIG. 1).

In some examples, a portion of active component 250 that protrudes from media-facing surface 205 becomes the point of magnetic recording head 240 that is closest to magnetic disk 208, that is, a close point 241 of magnetic recording head 240, and $d_{HMS}$ may be the distance between close point 241 and magnetic disk 208. Placing close point 241 closer to a specific feature (e.g., a write pole, a TMR junction) may provide improved performance of the respective component. Piezoelectric actuator 260 may enable close point 241 to be controlled more accurately than other means of displacing active component 250. For example, piezoelectric actuator 260 may improve control of the location of protrusion $d_p$ along media-facing surface 205 in the x-dimension, control of the shape and/or width of protrusion $d_p$, and/or control of the position of close point 241 along protrusion $d_p$. Controlling the shape and/or position of protrusion $d_p$ and/or close point 241 may, in some examples, enable better read and/or write performance of magnetic recording head 240.

In the example of recording head 240 of FIG. 2, piezoelectric actuator 260 is adjacent to active component 250. In this example, "adjacent" may include a separation between piezoelectric actuator 260 and active component 250, where the separation includes a material (e.g., a dielectric, a compliant material such as a polymer). Piezoelectric actuator 260 is a distance $d_1$ from media-facing surface 205 that is greater than a distance $d_2$ between a rear edge of active component 250 and media-facing surface 205. A part of piezoelectric actuator 260 is disposed behind active component 250 relative to media-facing surface 205 (in the z direction of FIG. 2). Positioning piezoelectric actuator 260 adjacent to and/or behind active component 250 may enable piezoelectric actuator 260 to exert forces $F_{-z}$ and/or $F_z$ on active component 250. A layer, or layers, of piezoelectric actuator 260 may, for example, expand or contract in response to receiving a signal (e.g., a voltage). An expansion $d_E$ or contraction $d_C$ of piezoelectric actuator may produce expansion or contraction forces, respectively, in volumes surrounding piezoelectric actuator 260. Expansion $d_E$ of piezoelectric actuator 260, for example, may exert force $F_{-z}$ on active component 250. Contraction $d_C$ of piezoelectric actuator 260 may exert force $F_z$ on active component 250. The magnitude of expansion $d_E$ or contraction $d_C$ of piezoelectric actuator 260, and thus the magnitudes of forces $F_{-z}$ and $F_z$, respectively, may be defined by the signal received by piezoelectric actuator 260, for example by a change in a voltage applied to piezoelectric actuator 260, and may define the change in displacement and protrusion $d_p$ of active component 250. That is, by controlling a signal that is directed to piezoelectric actuator 260 (e.g., a voltage), the magnitude of protrusion $d_p$ and the resultant $d_{HMS}$ may be controlled. In contrast to other means of controlling displacement and head-media spacing of an active component of a magnetic recording head, applying a voltage to a piezoelectric actuator (e.g., across a layer of piezoelectric material of the piezoelectric actuator) may enable finer and/or more consistent control of protrusion $d_p$ and thus $d_{HMS}$.

Compliant layers 272 and 274 are each coupled to a surface of piezoelectric actuator 260. Compliant layers 272 and 274 each extend substantially orthogonal to and toward the media-facing surface 205. In one example, portions of compliant layers 272 and 274 are adjacent to active component 250. Compliant layers 272 and 274 may each include a mechanically compliant dielectric material such as polyimide. Compliant layers 272 and 274 are each configured to increase the efficiency of displacement of active component 250 for a given expansion $d_E$ or contraction $d_C$ of piezoelectric actuator 260. For example, compliant layers 272 and 274 may increase the magnitude of a change in protrusion $d_p$ for a given expansion $d_E$, which itself may be determined by a voltage applied to a layer of piezoelectric actuator 260. The term "stroke efficiency" may be used to quantify this efficiency metric (e.g., nanometers of protrusion per applied volt, or nm/V), and including compliant layers 272 and/or 274 may provide a higher stroke efficiency than a magnetic recording head that does not include one or more compliant layers. Compliant layers 272 and 274 that are longer than piezoelectric actuator 260 in the direction of expansion (e.g., the media-facing-z direction of the example of FIG. 2) may further increase stroke efficiency. For example, compliant layers 272 and 274 extend beyond piezoelectric actuator 260 toward media-facing surface 205 by distances $d_3$ and $d_4$, respectively. Additionally, compliant layers 272 and/or 274 may electrically isolate other components of magnetic recording head 240 from voltages that are applied to piezoelectric actuator 260.

Blocking beam 280 is disposed behind piezoelectric actuator 260, in some embodiments, relative to media-facing surface 205 and may be disposed at a similar position to piezoelectric actuator 260 in the x and y dimensions of FIG. 2. Blocking beam 280 is configured to reduce a voltage that is required to displace active component 250 by a distance (e.g., increase the stroke efficiency) by directing expansion $d_E$ of piezoelectric actuator 260 toward media-facing surface 205. Blocking beam 280 may be or may include a layer or block of material having a high modulus of elasticity (e.g., silicon carbide, sapphire, tungsten, tungsten carbide, graphene). Blocking beam 280 is placed relative to piezoelectric actuator 260 such that expansion $d_E$ of piezoelectric actuator 260 is partially mitigated in the vicinity of blocking beam 280, with resultant forces from expansion $d_E$ directed away from blocking beam 280 and increasing the magnitude of the force directed toward active component 250. This redirection of expansion $d_E$ may increase the magnitude of force $F_{-z}$ that piezoelectric actuator 260 exerts on active component 250 and may increase the stroke efficiency of piezoelectric actuator 260 in displacing active component 250 by a change in protrusion $d_p$.

It should be noted that the blocking beam 280 and compliant layers 272 and/or 274, while useful in increasing stroke efficiency, are in no way required for the successful operation of the piezoelectric actuator 260. Thus, while a particular embodiment of the recording head 240 is illustrated herein, it should be understood that some, in any combination, of the above components may be omitted in any particular substantiation of the recording head 240.

Figure 3:
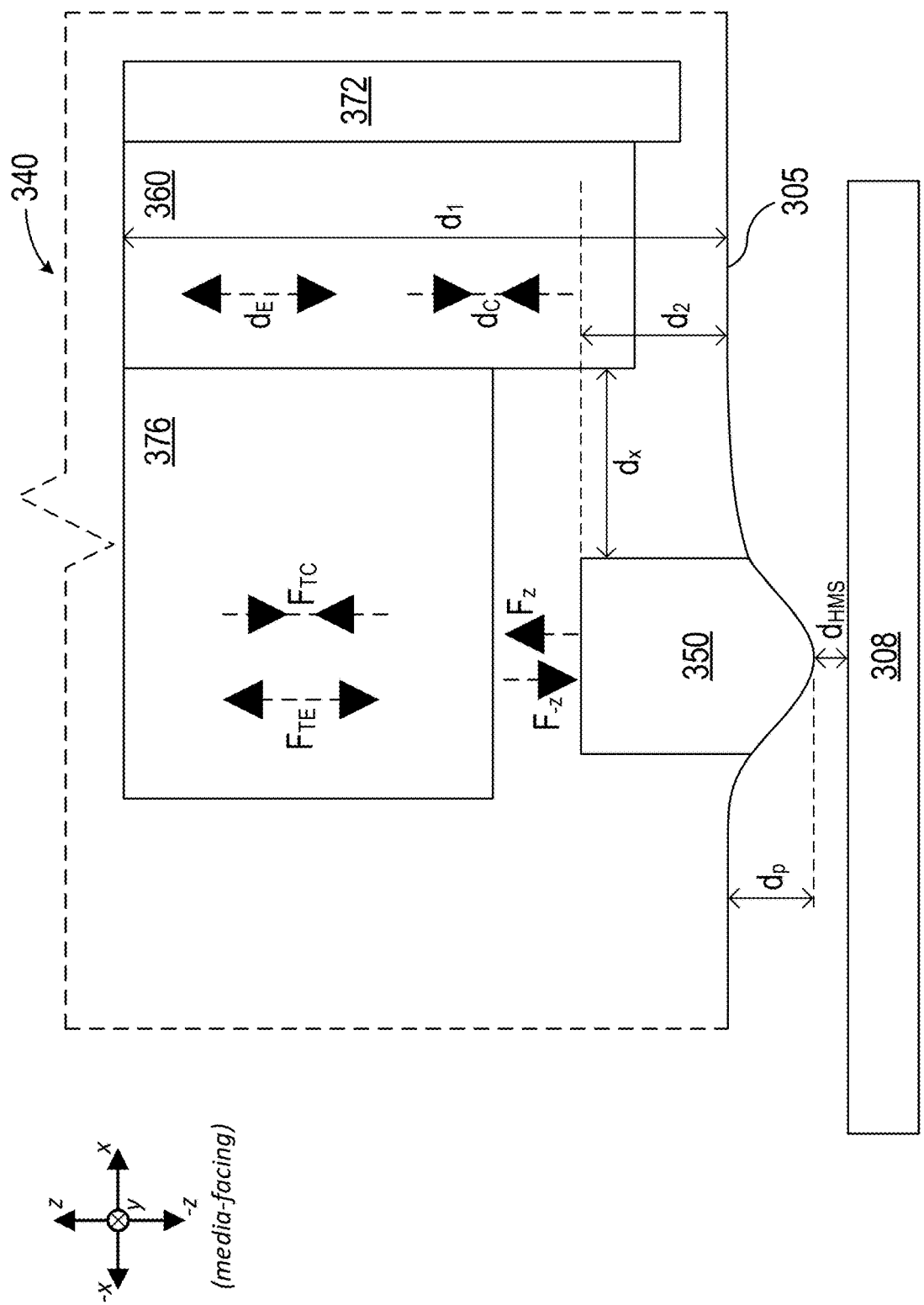
FIG. 3 is a cross-sectional view of an example magnetic recording head, in accordance with aspects of this disclosure.

FIG. 3 is a cross-sectional view of an example magnetic recording head, in accordance with aspects of this disclosure. Magnetic recording head 340 may be a magnetic recording head of HDD 100 of FIG. 1. Magnetic recording head 340 includes an active component 350, a piezoelectric actuator 360, and a mechanical amplification structure 376. In the example of FIG. 3, magnetic recording head 340 includes a compliant layer 372.

Active component 350 is disposed proximal to a media-facing surface 305 of magnetic recording head 340. A feature or features of active component 350 may be presented on media-facing surface 305. Magnetic recording head 340 may be positioned over a surface of a proximal magnetic disk 308 such that a portion of active component 350 is proximal to magnetic disk 308 and is separated from magnetic disk 308 by a head-media spacing (HMS) $d_{HMS}$. In some examples, active component 350 is a writer, a reader, or an NFT.

Piezoelectric actuator 360 of the example of FIG. 3 is distal to active component 350. In this example, piezoelectric actuator 360 is disposed a distance dx from active component 350 in the x direction. Piezoelectric actuator 360 and active component 350 may be separated by one or more layers of material, one or more features, and/or one or more components of magnetic recording head 340. A rear edge of piezoelectric actuator 360 is a distance $d_1$ from media-facing surface 305 that is greater than a distance $d_2$ between a rear edge of active component 350 and media-facing surface 305.

Mechanical amplification structure 376 is configured to displace active component 350 by transferring a mechanical force exerted by piezoelectric actuator 360 to active component 350. For example, a layer or layers of piezoelectric actuator 360 may expand (expansion $d_E$) or contract (contraction $d_C$) in response to receiving a signal (e.g., a voltage), producing respective expansion forces or contraction forces near piezoelectric actuator 360. Mechanical amplification structure 376 may respond to forces produced by expansion $d_E$ and contraction $d_C$ of piezoelectric actuator 360, producing its own expansion force $F_{TE}$ or contraction force $F_{TC}$. Expansion force $F_{TE}$ or contraction force $F_{TC}$ may exert a force $F_{-z}$ or $F_z$, respectively, on active component 350, displacing active component 350 and changing a protrusion $d_p$ of active component 350. That is, mechanical amplification structure 376 may effectively enable a piezoelectric actuator 360 that is distal to active component 350 to displace active component 350 by transferring a force of expansion $d_E$ or a force of contraction $d_C$ over a distance greater than dx and exerting a force $F_{-z}$ or $F_z$, respectively, on active component 350. In some examples, placing piezoelectric actuator 360 distal to active component 350 and displacing active component 350 by transferring expansion and contraction forces through mechanical amplification structure 376 may enable piezoelectric actuator 360 to be utilized in a magnetic recording head 340 that does not have space to include piezoelectric actuator 360 proximal to active component 350 (e.g., due to features and/or other components). In some examples, placing piezoelectric actuator 360 distal to active component 350 and displacing active component 350 by transferring expansion and contraction forces through mechanical amplification structure 376 may protect active component 350 and/or other proximal components and/or features from signals that are applied to expand and contract piezoelectric actuator 360 (e.g., voltages).

Figure 4:
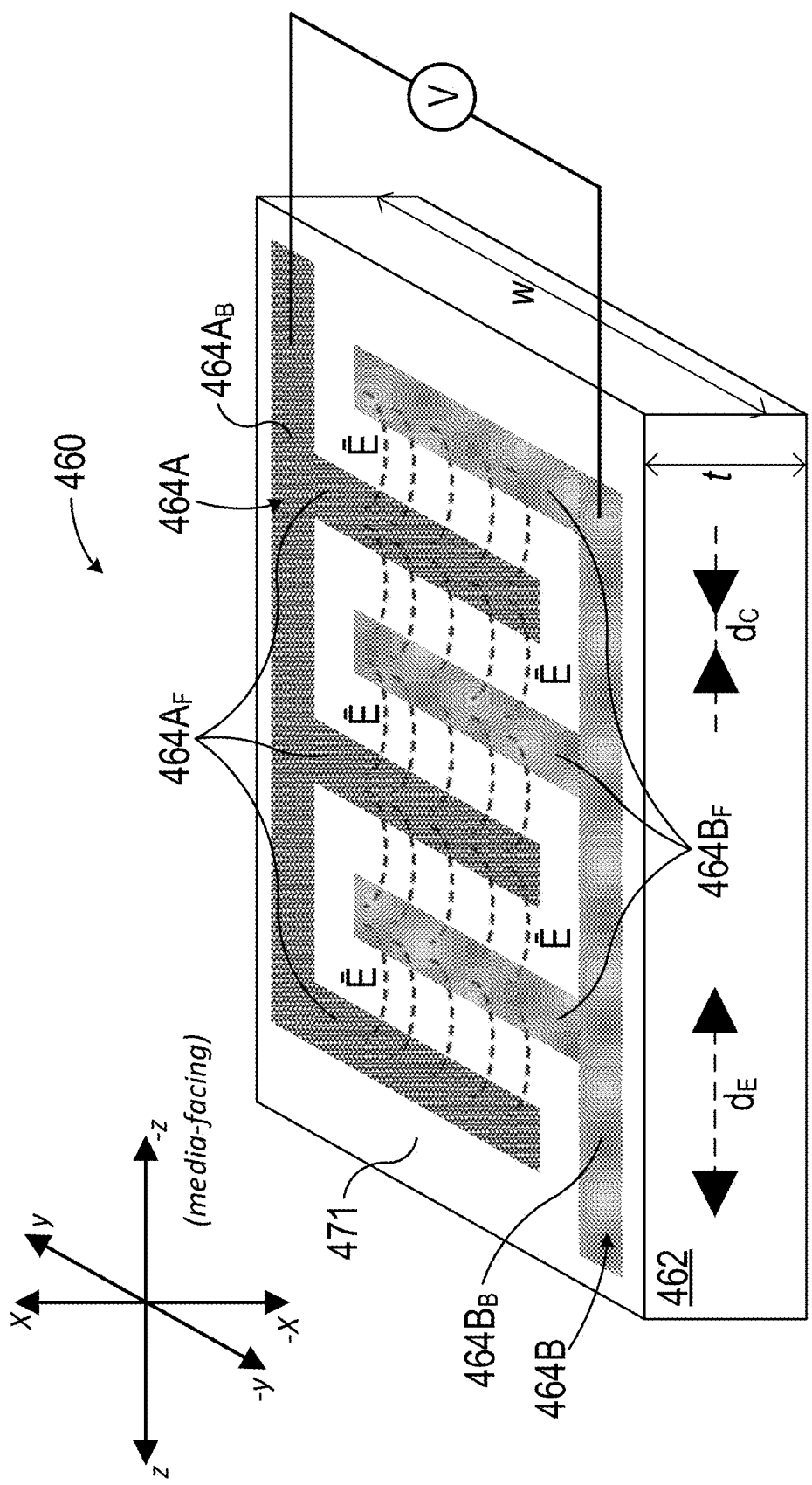
FIG. 4 is a perspective view of an example piezoelectric actuator of a magnetic recording head, in accordance with aspects of this disclosure.

FIG. 4 is a perspective view of an example piezoelectric actuator of an example magnetic recording head, in accordance with aspects of this disclosure. Piezoelectric actuator 460 may be an example of piezoelectric actuator 260 of FIG. 2. Piezoelectric actuator 460 may be an example of piezoelectric actuator 360 for FIG. 3. Piezoelectric actuator 460 includes a piezoelectric layer 462, a first electrode 464A and a second electrode 464B. Piezoelectric layer 462 includes a piezoelectric material. Examples of piezoelectric materials include lead zirconate titanate (PZT), aluminum nitride (AlN), lead magnesium niobate-lead titanate (PMN-PT), sodium potassium niobate, polycrystalline zinc oxide (ZnO), sodium tungstate, some polymers such as polyvinylidene fluoride (PVDF), or other known, or future known, piezoelectric materials. In some examples, a piezoelectric material may include a composite (e.g., a polydimethylsiloxane (PDMS)/PZT composite).

First electrode 464A and second electrode 464B are coupled to piezoelectric layer 462. In the example of FIG. 4, first electrode 464A and second electrode 464B are interdigitated electrodes (IDEs). That is, each of first electrode 464A and second electrode 464B include an elongated base ($464A_B$ and $464B_B$, respectively) and a plurality of elongated fingers ($464A_F$ and $464B_F$, respectively). The elongated fingers of $464A_F$ and $464B_F$ protrude from and are substantially perpendicular to their respective elongated base $464A_B$ and $464B_B$. First electrode 464A and second electrode 464B are coupled to a surface 471 of piezoelectric layer 462. First electrode 464A and second electrode 464B are arranged on surface 471 of piezoelectric layer 462 such that elongated base $464A_B$ of first electrode 464A is substantially parallel to elongated base $464B_B$ of second electrode 464B, elongated fingers $464A_F$ of first electrode 464A point toward elongated base $464B_B$ of second electrode 464B, and elongated fingers $464B_F$ of second electrode 464B point toward elongated base $464A_B$ of first electrode 464A. A space between elongated base $464A_B$ of first electrode 464A and elongated base $464B_B$ of second electrode 464B is occupied by an interdigitated arrangement of alternating and substantially parallel elongated fingers $464A_F$ of first electrode 464A and elongated fingers $464B_F$ of second electrode 464B.

Applying a voltage V between first electrode 464A and second electrode 464B may produce electric fields $\tilde{E}$ between elongated fingers $464A_F$ of first electrode 464A and elongated fingers $464B_F$ of second electrode 464B. Electric fields $\tilde{E}$ may penetrate piezoelectric layer 462 and induce polarization in a piezoelectric material of piezoelectric layer 462, causing piezoelectric layer 462 to expand (expansion $d_E$) or contract ($d_C$), depending on the directions of applied voltage V and the produced electric fields $\tilde{E}$. Piezoelectric actuator 460 of FIG. 4 demonstrates an example of a piezoelectric material of piezoelectric layer 462 having a $d_{33}$ charge constant. An electric field $\tilde{E}$ oriented parallel to the z dimension in a piezoelectric material having a $d_{33}$ charge constant produces expansion $d_E$ or contraction $d_C$ in the z dimension, that is, parallel to electric field $\tilde{E}$. Piezoelectric actuator 460 may be oriented in a magnetic recording head (e.g., magnetic recording head 240 of FIG. 2, magnetic recording head 340 of FIG. 3) such that expansion $d_E$ and contraction $d_C$ are in a dimension that is substantially orthogonal to a media-facing surface of the respective magnetic recording head (e.g., media-facing surface 205, media-facing surface 305), producing displacement of an active component (e.g., active component 250, active component 350) and change in protrusion $d_p$ of the respective active component from the respective media-facing surface. The magnitude of $d_E$ and/or $d_C$ under an applied voltage, and thus the magnitude of forces applied to an active component (e.g., forces $F_{-z}$ or $F_z$ of FIG. 2 or FIG. 3) may be affected by a thickness t (in the x dimension) and/or a width w (in the y dimension) of piezoelectric layer 462. In some examples, the x dimension is a down-track dimension of an associated magnetic recording head (e.g., magnetic recording head 240 of FIG. 2, magnetic recording head 340 of FIG. 3). In some examples, the y dimension is a cross-track dimension of an associated magnetic recording head (e.g., magnetic recording head 240 of FIG. 2, magnetic recording head 340 of FIG. 3).

Figure 5:
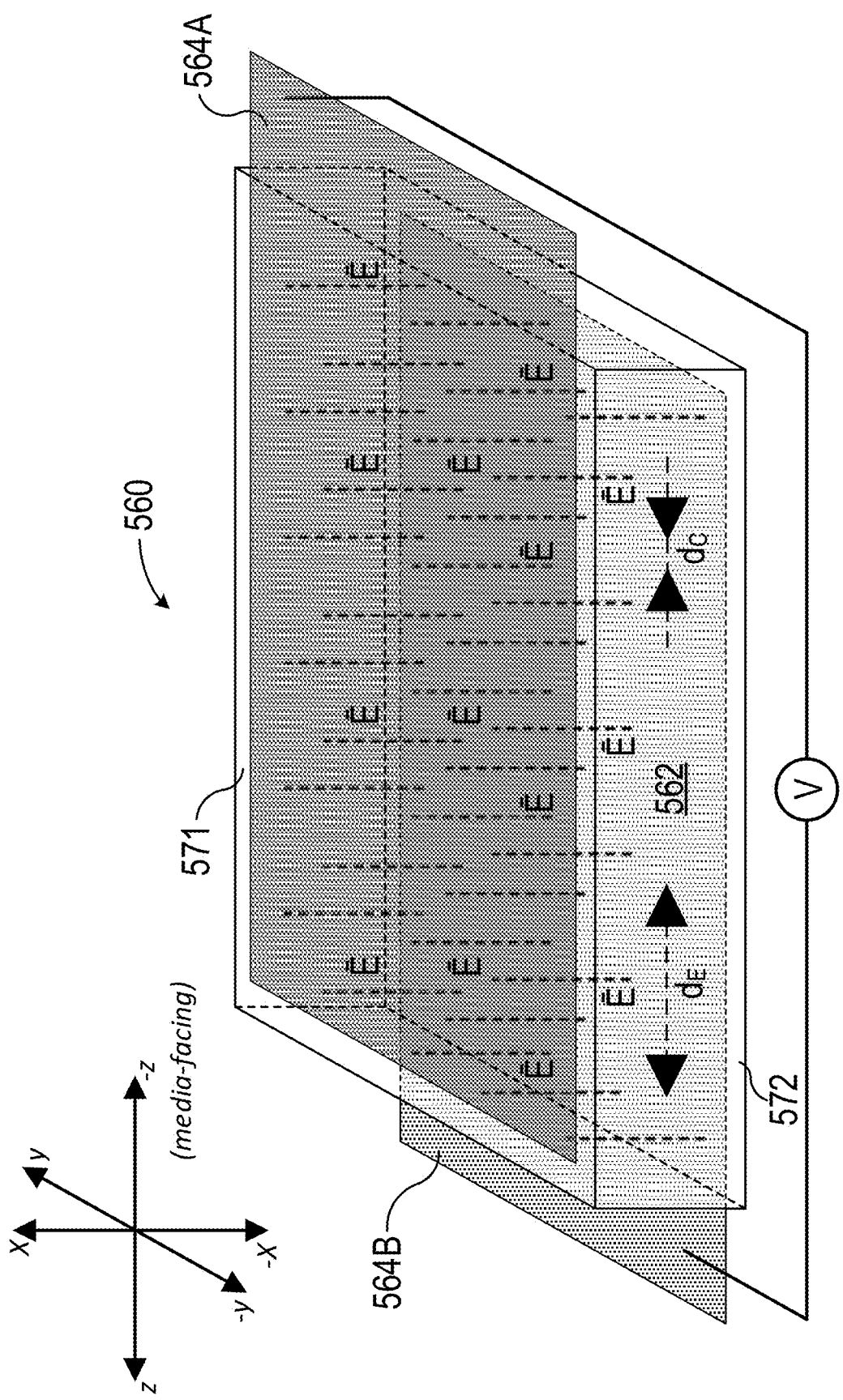
FIG. 5 is a perspective view of an example piezoelectric actuator of a magnetic recording head, in accordance with aspects of this disclosure.

FIG. 5 is a perspective view of an example piezoelectric actuator of an example magnetic recording head, in accordance with aspects of this disclosure. Piezoelectric actuator 560 may be an example of piezoelectric actuator 260 of FIG. 2. Piezoelectric actuator 560 may be an example of piezoelectric actuator 360 for FIG. 3. Piezoelectric actuator 560 includes a piezoelectric layer 562, a first electrode 564A, and a second electrode 564B. Piezoelectric layer 562 includes a piezoelectric material. First electrode 564A and second electrode 564B are coupled to piezoelectric layer 562. In the example of FIG. 5, first electrode 564A and second electrode 564B are planar electrodes. First electrode 564A is coupled to a first surface 571 of piezoelectric layer 562. Second electrode 564B is coupled to a second surface 572 of piezoelectric layer 562. Second surface 572 is opposite and substantially parallel to first surface 571.

Applying a voltage V between first electrode 564A and second electrode 564B may produce electric fields $\tilde{E}$ in piezoelectric layer 562 between first electrode 564A and second electrode 564B. Electric fields E may induce a polarization in a piezoelectric material of piezoelectric layer 562, causing piezoelectric layer 562 to expand (expansion $d_E$) or contract ($d_C$), depending on the directions of electric fields $\tilde{E}$. Piezoelectric actuator 560 of FIG. 5 demonstrates an example of a piezoelectric material of piezoelectric layer 562 having a $d_{31}$ charge constant. An electric field $\tilde{E}$ oriented parallel to the x dimension in a piezoelectric material having a $d_{31}$ charge constant produces expansion $d_E$ or contraction $d_C$ in the z dimension, that is, perpendicular to electric field $\tilde{E}$. Piezoelectric actuator 560 may be oriented in a magnetic recording head (e.g., magnetic recording head 240 of FIG. 2, magnetic recording head 340 of FIG. 3) such that expansion $d_E$ and contraction $d_C$ are in a dimension that is substantially orthogonal to a media-facing surface of the respective magnetic recording head (e.g., media-facing surface 205, media-facing surface 305), producing a displacement of an active component (e.g., active component 250, active component 350) and change in protrusion $d_p$ of the respective active component from the media-facing surface. In some examples, the x dimension is a down-track dimension of an associated magnetic recording head (e.g., magnetic recording head 240 of FIG. 2, magnetic recording head 340 of FIG. 3). In some examples, the y dimension is a cross-track dimension of an associated magnetic recording head (e.g., magnetic recording head 240 of FIG. 2, magnetic recording head 340 of FIG. 3).

FIG. 6A is a cross-sectional view of an example piezoelectric actuator of an example magnetic recording head, in accordance with aspects of this disclosure. Piezoelectric actuator 660 may be an example of piezoelectric actuator 260 of FIG. 2. Piezoelectric actuator 660 may be an example of piezoelectric actuator 360 for FIG. 3.

Piezoelectric actuator 660 includes a plurality of piezoelectric elements 661. Piezoelectric elements 661 are provided in a stacked configuration along a stacking direction x, with each piezoelectric element 661 adjacent (e.g., adjacent and contacting, adjacent and separated by a layer or layers) to at least one other piezoelectric element 661. In some examples, the x dimension of FIG. 6A is a down-track dimension of an associated magnetic recording head (e.g., magnetic recording head 240 of FIG. 2, magnetic recording head 340 of FIG. 3).

Each piezoelectric element 661 includes a piezoelectric layer 662, a first electrode 664A coupled to its respective piezoelectric layer 662, and a second electrode 664B coupled to its respective the piezoelectric layer 662. Each piezoelectric layer 662 includes a first surface 671 and a second surface 672 that are substantially parallel to each other. First surface 671 and second surface 672 of piezoelectric layer 662 of each of the plurality of piezoelectric elements 661 are substantially orthogonal to stacking direction x. First electrode 664A and second electrode 664B of each piezoelectric element 661 are interdigitated electrodes that are coupled to first surface 671 of piezoelectric layer 662 of each piezoelectric element 661.

Each piezoelectric layer 662 includes a piezoelectric material such that a voltage applied between a first electrode 664A and a second electrode 664B that are coupled to each piezoelectric layer 662 may cause each piezoelectric layer 662 to expand or contract, depending on the directions of electric fields E produced by the applied voltage. Simultaneously applying a voltage between the first electrode 664A and the second electrode 664B of each piezoelectric element 661 may cause each piezoelectric layer 662 to expand or contract at the same time (e.g., in the z dimension). In some examples, a piezoelectric actuator 660 that includes multiple piezoelectric layers 662, each with respective electrodes 664A and 664B, may enable piezoelectric actuator 660 to displace an active component of a magnetic recording head (e.g., active component 250 of FIG. 2, active component 350) with a higher stroke efficiency than a piezoelectric actuator that does not include multiple piezoelectric layers. This higher stroke efficiency may be enabled by a more uniform electric field penetration of the piezoelectric material that is provided by having multiple electrodes 664A and 664B. That is, in contrast to having a single layer of a piezoelectric material wherein a majority of an applied voltage, and thus an electric field, is distributed in a volume near the surface to which the electrodes are coupled, stacking multiple piezoelectric elements, each with a piezoelectric layer and two electrodes, may ensure that a larger total volume of piezoelectric material of the piezoelectric element is exposed to an electric field and is thus able to expand and contract in response.

The plurality of piezoelectric elements 661 of FIG. 6A includes a first piezoelectric element $661_1$ and a second piezoelectric element $661_2$ adjacent to first piezoelectric element $661_1$. First piezoelectric element $661_1$ includes a piezoelectric layer $662_1$, a first electrode $664A_1$, and a second electrode $664B_1$. First electrode $664A_1$ and second electrode $664B_1$ are coupled to a first surface $671_1$ of piezoelectric layer $662_1$. Second piezoelectric element $661_2$ includes a piezoelectric layer $662_2$, a first electrode $664A_2$, and a second electrode $664B_2$. First electrode $664A_2$ and second electrode $664B_2$ are coupled to a first surface $671_2$ of piezoelectric layer $662_2$. A second surface $672_2$ of piezoelectric layer $662_2$ of second piezoelectric element $661_2$ faces and is substantially parallel to first surface $671_1$ of piezoelectric layer $662_1$ of first piezoelectric element $661_1$.

The plurality of piezoelectric elements 661 may further include at least one additional piezoelectric element 661. In the example of FIG. 6A, piezoelectric actuator 660 includes first piezoelectric element $661_1$, second piezoelectric element $661_2$, and N additional piezoelectric elements 661. That is, the total number of piezoelectric elements 661 of this example is N+2, with piezoelectric element $661_{N+2}$ disposed at an opposite end of piezoelectric actuator 660 from piezoelectric element $661_1$. Piezoelectric element $661_{N+2}$ includes a piezoelectric layer $662_{N+2}$, a first electrode $664A_{N+2}$, and a second electrode $664B_{N+2}$. First electrode $664A_{N+2}$ and second electrode $664B_{N+2}$ are coupled to a first surface $671_{N+2}$ of piezoelectric layer $662_{N+2}$. A second, opposite surface $672_{N+2}$ of piezoelectric layer $662_{N+2}$ faces the other piezoelectric elements 661 of the plurality of piezoelectric elements 661.

A remaining N−1 piezoelectric elements 661 may be disposed between piezoelectric element $661_2$ and piezoelectric element $661_{N+2}$, with first piezoelectric element $661_1$, second piezoelectric element $661_2$, piezoelectric element $661_{N+2}$, and any remaining N−1 piezoelectric elements 661 provided in a stacked configuration along stacking direction x. Each remaining N−1 piezoelectric element 661 includes a piezoelectric layer 662, a first electrode 664A, and a second electrode 664B. First electrode 664A and second electrode 664B of each remaining N−1 piezoelectric element 661 are coupled to the first surface 671 of the piezoelectric layer 662 of each remaining N−1 piezoelectric element 661. The second surface 672 of the piezoelectric layer 662 of each remaining N−1 piezoelectric element 661 faces and is substantially parallel to the first surface 671 of an adjacent piezoelectric element 661.

An intervening insulating layer $665_1$ may be disposed between first piezoelectric element $661_1$ and second piezoelectric element $661_2$. Insulating layer $665_1$ is configured to electrically isolate first piezoelectric element $661_1$ and second piezoelectric element $661_2$ from each other. Insulating layer $665_1$ may include an electrically insulating material (e.g., silicon dioxide, aluminum oxide, an electrically insulating polymer). Insulating layer $665_1$ is coupled to first surface $671_1$ of piezoelectric layer $662_1$ of first piezoelectric element $661_1$, first electrode $664A_1$ of first piezoelectric element $661_1$, second electrode $664B_1$ of first piezoelectric element $661_1$, and second surface $672_2$ of piezoelectric layer $662_2$ of second piezoelectric element $661_2$. First piezoelectric element $661_1$, insulating layer $665_1$, and second piezoelectric element $661_2$ are provided in a stacked configuration along stacking direction x.

Intervening insulating layers 665 may be disposed between each adjacent piezoelectric element 661 of the plurality of piezoelectric elements 661. That is, a piezoelectric actuator 660 that includes N+2 piezoelectric elements 661 may include N+1 insulating layers 665. Each insulating layer may be coupled to the first surface 671 of the piezoelectric layer 662 of a first adjacent piezoelectric element 661, the first electrode 664A of the first adjacent piezoelectric element 661, the second electrode 664B of the first adjacent piezoelectric element 661, and the second surface 672 of a second adjacent piezoelectric element 661 that is adjacent to the first adjacent piezoelectric element 661. In this example, each piezoelectric element 661 of the plurality of piezoelectric elements 661 and each insulating layer 665 are provided in a stacked configuration along stacking direction x. It should be noted, however, that insulating layers 665 are optional and are in no way required for successful operation of piezoelectric actuator 660. That is, some examples will omit insulating layers 665 between adjacent piezoelectric elements 661. These examples are contemplated and are within the scope of this disclosure.

Figure 6B:
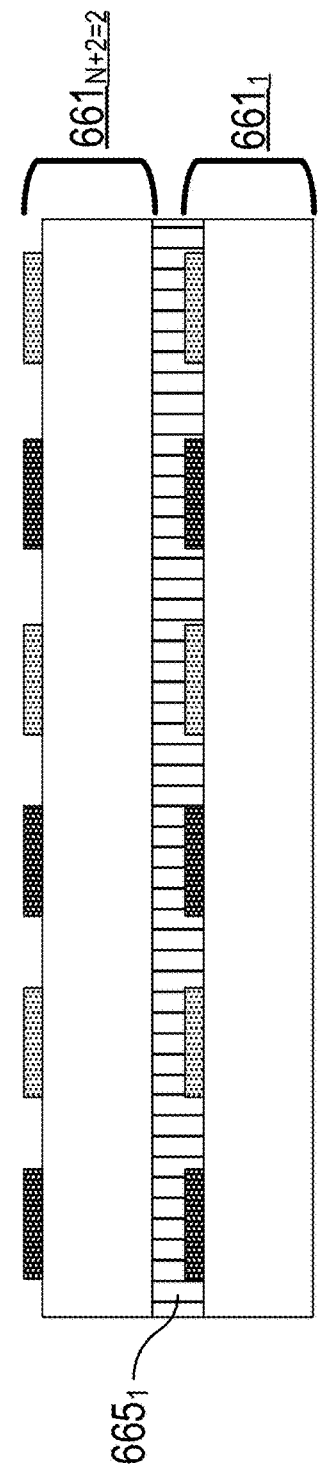
FIG. 6B is a cross-sectional view of an example piezoelectric actuator of a magnetic recording head, in accordance with aspects of this disclosure.

FIG. 6B is a cross-sectional view of an example piezoelectric actuator of an example magnetic recording head, in accordance with aspects of this disclosure. Piezoelectric actuator 660 of FIG. 6B may be an example of piezoelectric actuator 660 of FIG. 6A when the number N of additional piezoelectric elements 661 is zero. That is, piezoelectric actuator 660 of this example includes a first piezoelectric element $661_1$ and an adjacent second piezoelectric element $661_2$. An intervening insulating layer $665_1$ may be disposed between first piezoelectric element $661_1$ and second piezoelectric element $661_2$.

Figure 6C:
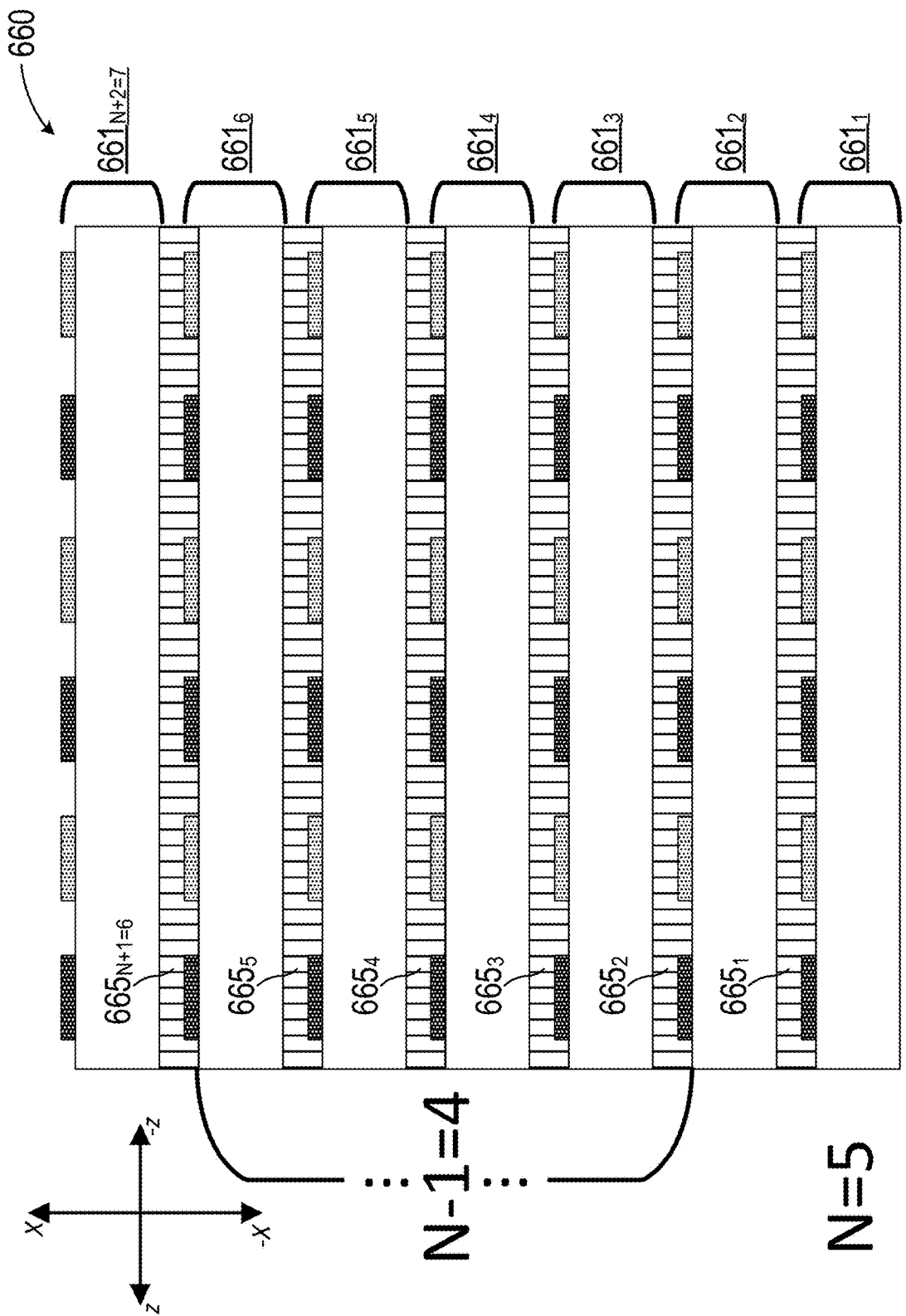
FIG. 6C is a cross-sectional view of an example piezoelectric actuator of a magnetic recording head, in accordance with aspects of this disclosure.

FIG. 6C is a cross-sectional view of an example piezoelectric actuator of an example magnetic recording head, in accordance with aspects of this disclosure. Piezoelectric actuator 660 of FIG. 6C may be an example of piezoelectric actuator 660 of FIG. 6A when the number N of additional piezoelectric elements 661 is five. That is, piezoelectric actuator 660 of this example includes a total of N+2=7 piezoelectric elements 661 (i.e., a first piezoelectric element $661_1$, a second piezoelectric element $661_2$, a third piezoelectric element $661_3$, a fourth piezoelectric element $661_4$, a fifth piezoelectric element $661_5$, a sixth piezoelectric element $661_6$, and a seventh piezoelectric element $661_7$). An intervening insulating layer 665 may be disposed between each adjacent piezoelectric element 661.

Figure 7A:
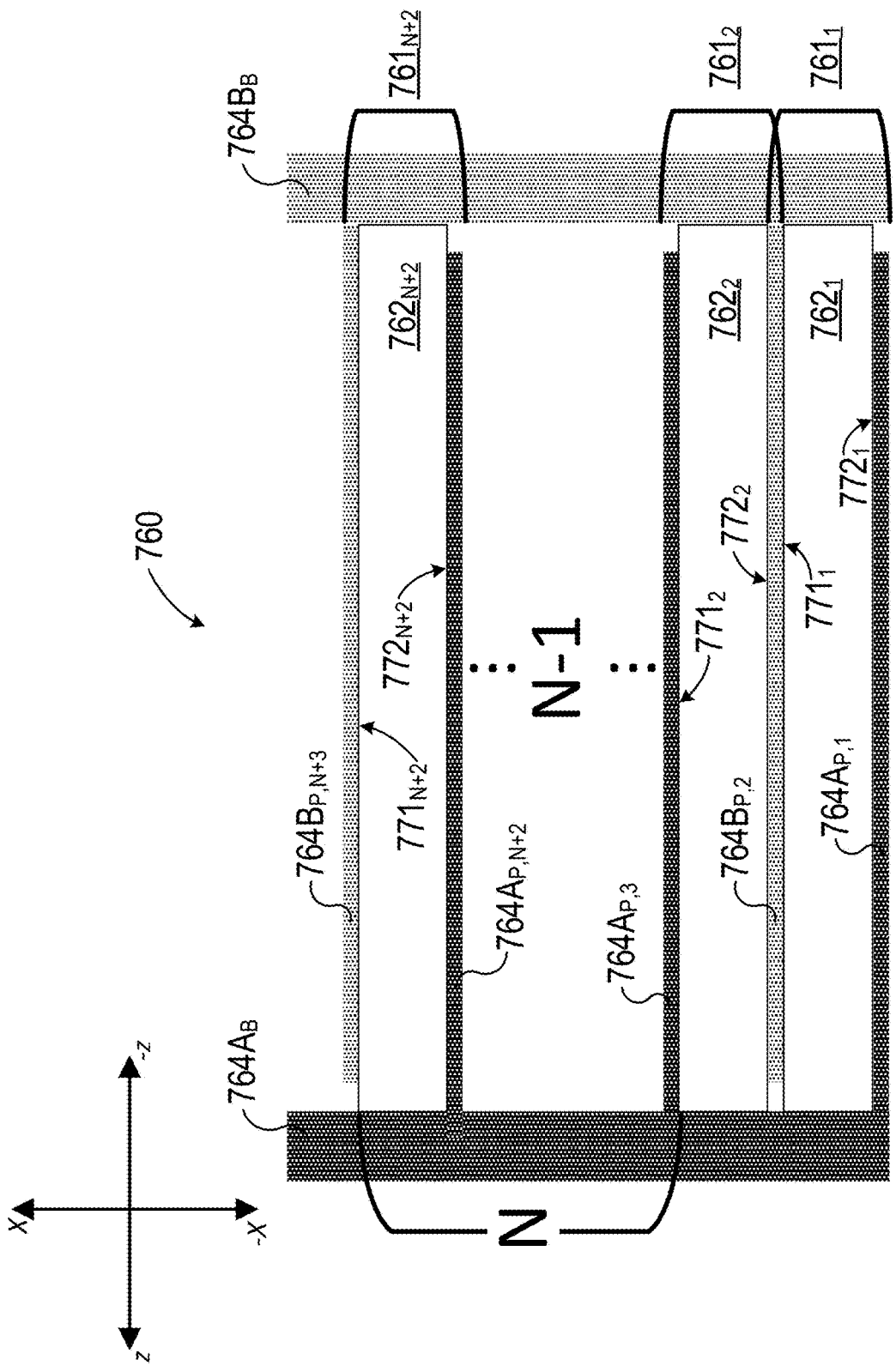
FIG. 7A is a cross-sectional view of an example piezoelectric actuator of a magnetic recording head, in accordance with aspects of this disclosure.

FIG. 7A is a cross-sectional view of an example piezoelectric actuator of an example magnetic recording head, in accordance with aspects of this disclosure. Piezoelectric actuator 760 may be an example of piezoelectric actuator 260 of FIG. 2. Piezoelectric actuator 760 may be an example of piezoelectric actuator 360 for FIG. 3.

Piezoelectric actuator 760 includes a plurality of piezoelectric elements 761. Piezoelectric elements 761 are provided in a stacked configuration along a stacking direction x, with each piezoelectric element 761 adjacent (e.g., adjacent and contacting, adjacent and separated by a layer or layers) to at least one other piezoelectric element 761. In some examples, the x dimension of FIG. 7A is a down-track dimension of an associated magnetic recording head (e.g., magnetic recording head 240 of FIG. 2, magnetic recording head 340 of FIG. 3).

Each piezoelectric element 761 includes a piezoelectric layer 762 that includes a piezoelectric material, an electrode $764A_P$ coupled to its respective piezoelectric layer 762, and an electrode $764B_P$ coupled to its respective the piezoelectric layer 762. Each piezoelectric layer 762 includes a first surface 771 and a second surface 772 that are substantially parallel to each other. First surface 771 and second surface 772 of the piezoelectric layer 762 of each of the plurality of piezoelectric elements 761 are substantially orthogonal to stacking direction x. Electrode $764A_P$ and electrode $764B_P$ of each piezoelectric element 761 are planar electrodes that are substantially orthogonal to stacking direction x. Piezoelectric layers 762, electrodes $764A_P$, and electrodes $764B_P$ are provided in a stacked configuration along stacking direction x such that an electrode (e.g., either an electrode $764A_P$ or an electrode $764B_P$) is disposed between and coupled to piezoelectric layers 762 of adjacent piezoelectric elements 761. That is, two adjacent piezoelectric elements 761 of piezoelectric actuator 760 share a common electrode (e.g., either an electrode $764A_P$ or an electrode $764B_P$). An electrode (e.g., an electrode $764A_P$ or an electrode $764B_P$) of each piezoelectric element 761 is coupled to first surface 771 of the piezoelectric layer 762 of each piezoelectric element 761, and an opposite electrode (e.g., an electrode $764B_P$ or an electrode $764A_P$) of each piezoelectric element 761 is coupled to second surface 772 of the piezoelectric layer 762 of each piezoelectric element 761. That is, electrodes $764A_P$ and electrodes $764B_P$ are arranged to alternate between pairs of adjacent piezoelectric elements 761 such that each piezoelectric layer 762 is coupled to an electrode $764A_P$ and an electrode $764B_P$.

Electrodes $764A_P$ are electrically coupled to an electrode base $764A_B$, and electrodes $764B_P$ are coupled to an electrode base $764B_B$. A voltage applied between electrode base $764A_B$ and electrode base $764B_B$ may therefore be distributed and applied between electrodes $764A_P$ and $764B_P$ and across the piezoelectric layer 762 of each piezoelectric element 761. Each piezoelectric layer 762 includes a piezoelectric material such that a voltage applied between the first electrode 764A$_P$ and the second electrode 764B$_P$ that are coupled to each piezoelectric layer 762 may cause each piezoelectric layer 762 to expand or contract, depending on the directions of electric fields E produced by the applied voltage. Simultaneously applying a voltage between the first electrode 764A and the second electrode 764B of each piezoelectric element 761 may cause each piezoelectric layer 762 to expand or contract at the same time (e.g., in the z dimension). In some examples, a piezoelectric actuator 760 that includes multiple piezoelectric layers 762, each with a respective electrode 764A and 764B disposed between itself and a piezoelectric layer 762 of an adjacent piezoelectric element, may enable piezoelectric actuator 760 to displace an active component of a magnetic recording head (e.g., active component 250 of FIG. 2, active component 350 of FIG. 3) with a higher stroke efficiency than a piezoelectric actuator that does not include multiple piezoelectric layers. A higher stroke efficiency may be enabled by having a stronger electric field applied across the piezoelectric material of each piezoelectric layer 762. A single thick layer of a piezoelectric material may require a higher voltage to produce a sufficiently strong electric field to polarize (and thus expand or contract) the piezoelectric material. In contrast, stacking multiple piezoelectric elements 761, each with electrodes 764A and 764B coupled to opposite surfaces of a piezoelectric layer 762, may ensure that each piezoelectric layer 762 is sufficiently thin to be polarized by a lower voltage, potentially improving the stroke efficiency and/or reducing the power consumption of piezoelectric actuator 760.

The plurality of piezoelectric elements 761 of FIG. 7A includes a first piezoelectric element 761$_1$, and a second piezoelectric element 761$_2$ adjacent to first piezoelectric element 761$_1$. First piezoelectric element 761$_1$ includes a piezoelectric layer 762$_1$, an electrode 764A$_{P,1}$, and an electrode 764B$_{P,2}$. Electrode 764B$_{P,2}$ is coupled to a first surface 771$_1$ of piezoelectric layer 762$_1$. Electrode 764A$_{P,1}$ is coupled to a second surface 772$_1$ of piezoelectric layer 762$_1$. Second piezoelectric element 761$_2$ includes a piezoelectric layer 762$_2$, electrode 764B$_{P,2}$, and an electrode 764A$_{P,3}$. Electrode 764A$_{P,3}$ is coupled to a first surface 771$_2$ of piezoelectric layer 762$_2$. Electrode 764B$_{P,2}$ is coupled to a second surface 772$_2$ of piezoelectric layer 762$_2$. That is, both first piezoelectric element 761$_1$ and second piezoelectric element 761$_2$ share a common electrode 764B$_{P,2}$.

The plurality of piezoelectric elements 761 may further include at least one additional piezoelectric element 761. In the example of FIG. 7A, piezoelectric actuator 760 includes first piezoelectric element 761$_1$, second piezoelectric element 761$_2$, and N additional piezoelectric elements 761. That is, the total number of piezoelectric elements 761 of this example is N+2, with piezoelectric element 761$_{N+2}$ disposed at an opposite end of piezoelectric actuator 760 from piezoelectric element 761$_1$. Piezoelectric element 761$_{N+2}$ includes a piezoelectric layer 762$_{N+2}$, an electrode 764A$_{P,N+2}$, and an electrode 764B$_{P,N+3}$. Electrode 764B$_{P,N+3}$ is coupled to a first surface 771$_{N+2}$ of piezoelectric layer 762$_{N+2}$. Electrode 764A$_{P,N+2}$ to a second, opposite surface 772$_{N+2}$ of piezoelectric layer 762$_{N+2}$.

A remaining N−1 piezoelectric elements 761 may be disposed between piezoelectric element 761$_2$ and piezoelectric element 761$_{N+2}$, with first piezoelectric element 761$_1$, second piezoelectric element 761$_2$, piezoelectric element 761$_{N+2}$, and any remaining N−1 piezoelectric elements 761 provided in a stacked configuration along stacking direction x. Each remaining N−1 piezoelectric element 761 includes a piezoelectric layer 762, an electrode 764A$_P$, and an electrode 764B$_P$. An electrode (e.g., an electrode 764A$_P$ or an electrode 764B$_P$) of each remaining N−1 piezoelectric element 761 is coupled to first surface 771 of the piezoelectric layer 762 of each remaining N−1 piezoelectric element 761. An opposite electrode (e.g., an electrode 764B$_P$ or an electrode 764A$_P$) of each remaining N−1 piezoelectric element 761 is coupled to second surface 772 of the piezoelectric layer 762 of each remaining N−1 piezoelectric element 761.

Figure 7B:
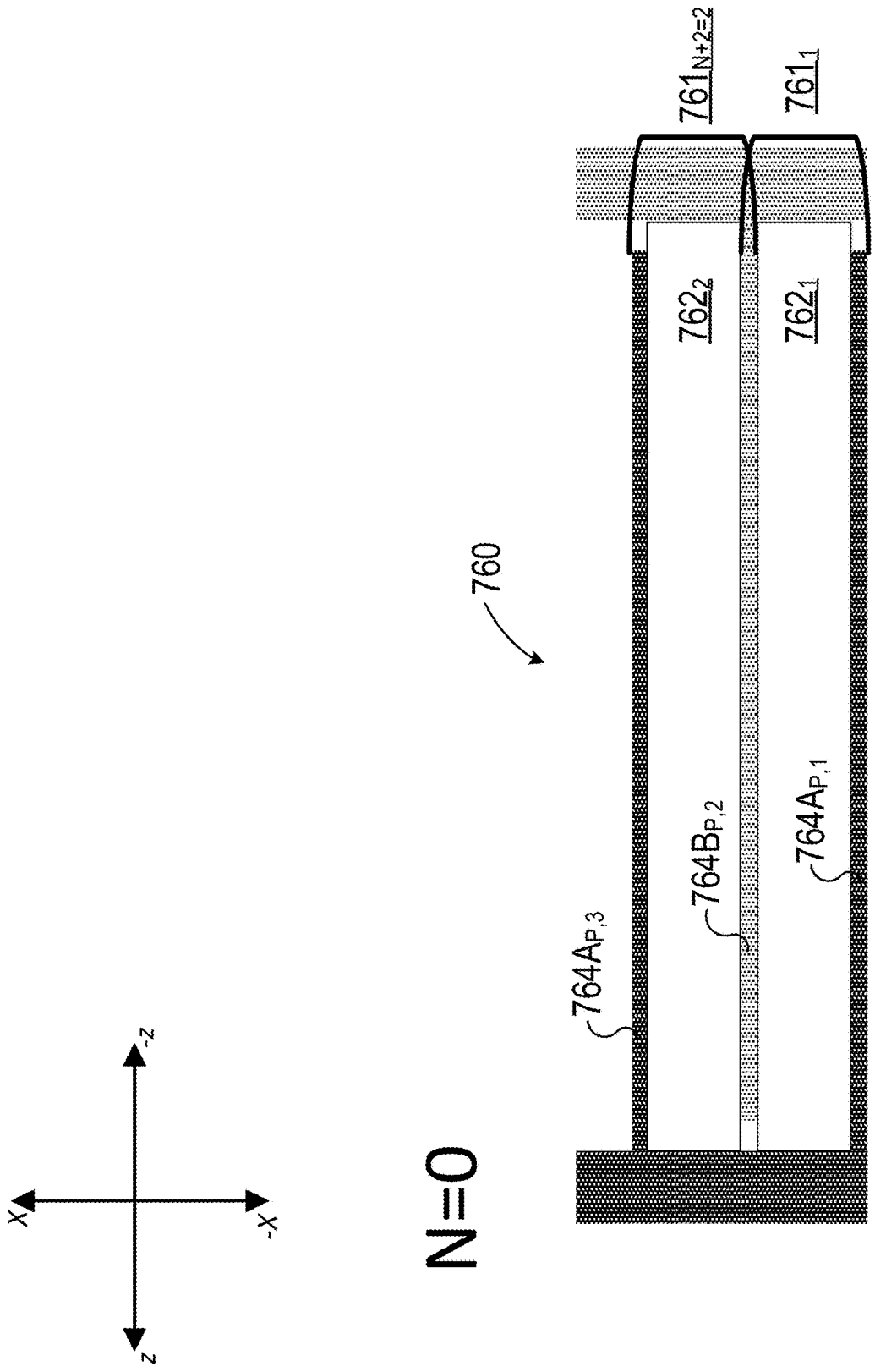
FIG. 7B is a cross-sectional view of an example piezoelectric actuator of a magnetic recording head, in accordance with aspects of this disclosure.

FIG. 7B is a cross-sectional view of an example piezoelectric actuator of an example magnetic recording head, in accordance with aspects of this disclosure. Piezoelectric actuator 760 of FIG. 7B may be an example of piezoelectric actuator 760 of FIG. 7A when the number N of additional piezoelectric elements 761 is zero. That is, piezoelectric actuator 760 of this example includes a first piezoelectric element 761$_1$ and an adjacent second piezoelectric element 761$_2$. An electrode 764A$_{P,1}$ is coupled to a piezoelectric layer 762$_1$ of first piezoelectric element 761$_1$. An electrode 764A$_{P,3}$ is coupled to a piezoelectric layer 762$_2$ of second piezoelectric element 761$_{N+2=2}$. An electrode 764B$_{P,2}$ is disposed between and coupled to piezoelectric layer 762$_1$ of first piezoelectric element 761$_1$ and piezoelectric layer 762$_2$ of second piezoelectric element 761$_2$. That is, first piezoelectric element 761$_1$ and second piezoelectric element 761$_2$ share a common electrode 764B$_{P,2}$. Electrode 764A$_{P,1}$, piezoelectric layer 762$_1$, electrode 764B$_{P,2}$, piezoelectric layer 762$_2$, and electrode 764A$_{P,3}$ are provided in a stacked configuration along a stacking direction x.

Figure 7C:
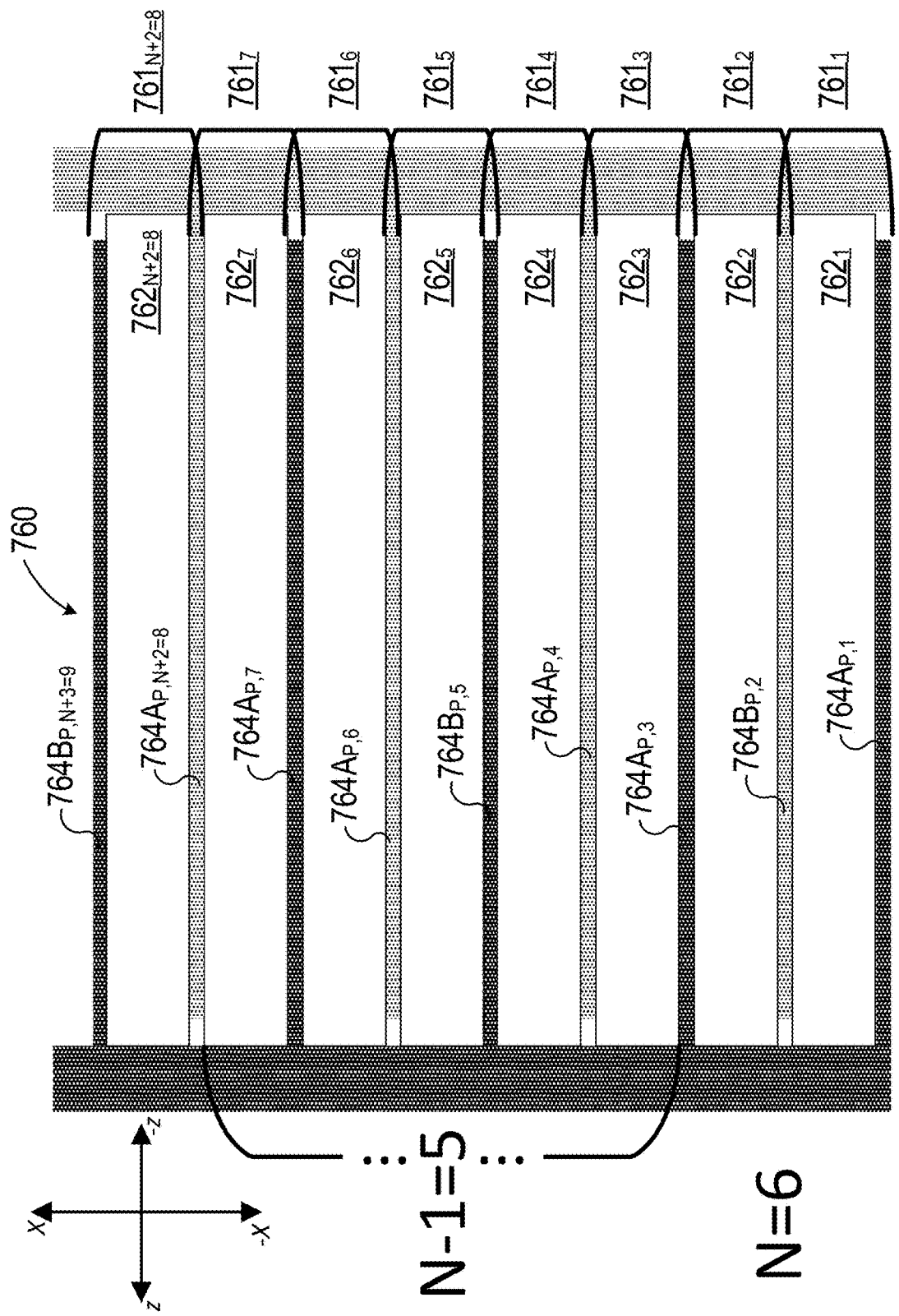
FIG. 7C is a cross-sectional view of an example piezoelectric actuator of a magnetic recording head, in accordance with aspects of this disclosure.

FIG. 7C is a cross-sectional view of an example piezoelectric actuator of an example magnetic recording head, in accordance with aspects of this disclosure. Piezoelectric actuator 760 of FIG. 7C may be an example of piezoelectric actuator 760 of FIG. 7A when the number N of additional piezoelectric elements 761 is six. That is, piezoelectric actuator 760 of this example includes a total of N+2=8 piezoelectric elements 761 (i.e., a first piezoelectric element 761$_1$, a second piezoelectric element 761$_2$, a third piezoelectric element 761$_3$, a fourth piezoelectric element 761$_4$, a fifth piezoelectric element 761$_5$, a sixth piezoelectric element 761$_6$, a seventh piezoelectric element 761$_7$, and an eight piezoelectric element 761$_{N+2=8}$). Each piezoelectric element 761 includes a piezoelectric layer 762. An electrode 764A$_P$ and an electrode 764B$_P$ are coupled to opposite surfaces of the piezoelectric layer 762 of each piezoelectric element 761. Piezoelectric layers 762, electrodes 764A$_P$, and electrodes 764B$_P$ are provided in a stacked configuration along a stacking direction x. An electrode (i.e., either an electrode 764A$_P$ or an electrode 764B$_P$) is disposed between the piezoelectric layers 762 of each adjacent piezoelectric element 761, with each pair of adjacent piezoelectric elements sharing a common electrode 764A$_P$ or 764B$_P$.

Various examples have been presented for the purposes of illustration and description. These and other examples are within the scope of the following claims.

What is claimed is:

1. A magnetic recording head comprising:
   an active component disposed proximal to a media-facing surface of the magnetic recording head;
   a piezoelectric actuator configured to exert a mechanical force to displace the active component such that a displacement of the active component by the piezoelectric actuator changes a protrusion of the active component from the media-facing surface;

a blocking beam adjacent to the piezoelectric actuator, the blocking beam positioned and configured such that expansion $d_E$ of piezoelectric actuator is partially mitigated in the vicinity of the blocking beam, with resultant forces from expansion $d_E$ directed away from the blocking beam, and increasing the magnitude of the force directed toward the active component; and wherein the blocking beam is composed of silicon carbide, sapphire, tungsten, tungsten carbide, or graphene, having a high modulus of elasticity relative to all other components of the magnetic recording head.

2. The magnetic recording head of claim 1, wherein the piezoelectric actuator is adjacent to the active component.

3. The magnetic recording head of claim 2, wherein at least a part of the piezoelectric actuator is a distance from the media-facing surface that is greater than a distance between a rear edge of the active component and the media-facing surface.

4. The magnetic recording head of claim 2, wherein at least a part of the piezoelectric actuator is disposed behind the active component relative to the media-facing surface.

5. The magnetic recording head of claim 1, wherein the piezoelectric actuator comprises a piezoelectric layer, a first electrode coupled to the piezoelectric layer, and a second electrode coupled to the piezoelectric layer, and wherein the first electrode and the second electrode are interdigitated electrodes that are coupled to a surface of the piezoelectric layer.

6. The magnetic recording head of claim 1, further comprising
a compliant layer that is coupled to a surface of the piezoelectric actuator and extends substantially orthogonal to and toward the media-facing surface.

7. The magnetic recording head of claim 6, wherein the piezoelectric actuator is adjacent to the active component.

8. The magnetic recording head of claim 7, wherein a portion of the compliant layer is adjacent to the active component.

9. The magnetic recording head of claim 6,
wherein the compliant layer is a first compliant layer,
wherein the surface of the piezoelectric actuator is a first surface of the piezoelectric actuator,
wherein the magnetic recording head further comprises a second compliant layer that is coupled to a second surface of the piezoelectric actuator, the second surface opposite and substantially parallel to the first surface, and
wherein the second compliant layer extends substantially orthogonal to and toward the media-facing surface.

10. The magnetic recording head of claim 9, wherein a portion of the second compliant layer is adjacent to the active component.

* * * * *